United States Patent
Bernadet et al.

(10) Patent No.: US 11,717,808 B2
(45) Date of Patent: Aug. 8, 2023

(54) PHOTOCATALYTIC CARBON DIOXIDE REDUCTION METHOD USING A PHOTOCATALYST IN THE FORM OF A POROUS MONOLITH

(71) Applicant: IFP Energies nouvelles, Rueil-Malmaison (FR)

(72) Inventors: Sophie Bernadet, Merignac (FR); Antoine Fecant, Brignais (FR); Denis Uzio, Oullins (FR); Renal-Vasco Backov, Bordeaux (FR); Serge Ravaine, Cestas (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 822 days.

(21) Appl. No.: 16/608,568

(22) PCT Filed: Apr. 23, 2018

(86) PCT No.: PCT/EP2018/060380
§ 371 (c)(1),
(2) Date: Oct. 25, 2019

(87) PCT Pub. No.: WO2018/197435
PCT Pub. Date: Nov. 1, 2018

(65) Prior Publication Data
US 2021/0106977 A1    Apr. 15, 2021

(30) Foreign Application Priority Data
Apr. 28, 2017 (FR) ...................... 1753758

(51) Int. Cl.
| | |
|---|---|
| *B01J 23/10* | (2006.01) |
| *B01D 53/00* | (2006.01) |
| *B01D 53/86* | (2006.01) |
| *B01J 21/06* | (2006.01) |
| *B01J 21/08* | (2006.01) |
| *B01J 35/00* | (2006.01) |
| *B01J 35/04* | (2006.01) |
| *B01J 35/10* | (2006.01) |

(52) U.S. Cl.
CPC ............ *B01J 23/10* (2013.01); *B01D 53/007* (2013.01); *B01D 53/8671* (2013.01); *B01J 21/063* (2013.01); *B01J 21/08* (2013.01); *B01J 35/004* (2013.01); *B01J 35/0026* (2013.01); *B01J 35/0033* (2013.01); *B01J 35/04* (2013.01); *B01J 35/1014* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 35/1057* (2013.01); *B01J 35/1061* (2013.01); *B01J 35/1066* (2013.01); *B01J 35/1071* (2013.01); *B01J 35/1076* (2013.01); *B01D 2255/2065* (2013.01); *B01D 2255/20707* (2013.01); *B01D 2255/30* (2013.01); *B01D 2255/802* (2013.01); *B01D 2255/9202* (2013.01); *B01D 2255/9205* (2013.01); *B01D 2255/9207* (2013.01); *B01D 2257/504* (2013.01); *B01D 2259/804* (2013.01)

(58) Field of Classification Search
None
See application file for complete search history.

(56) References Cited

U.S. PATENT DOCUMENTS

2016/0339413 A1\* 11/2016 Boscaro ................ B01J 21/063

FOREIGN PATENT DOCUMENTS

| CN | 101024168 A | * | 8/2007 | ............ B01J 21/06 |
|---|---|---|---|---|
| FR | 2975309 A1 | | 11/2012 | |
| FR | 3026965 A1 | * | 4/2016 | .......... B01J 35/0006 |
| FR | 3026965 B1 | | 10/2019 | |
| JP | 2009007219 A | * | 1/2009 | ............ A61L 9/205 |
| WO | 15011072 A1 | | 1/2015 | |

OTHER PUBLICATIONS

International Search report PCT/EP2018/060380 dated Jun. 18, 2018 (pp. 1-3).
Tahir Muhammad et al: "Photocatalytic CO2reduction and kinetic study over In/TiO2nanoparticles supported microchannel monolith photoreactor", Applied Catalysis A: General, vol. 467, Aug. 17, 2013 (Aug. 17, 2013), pp. 483-496, XP028758167, ISSN: 0926-860X.

\* cited by examiner

*Primary Examiner* — Paul A Wartalowicz
*Assistant Examiner* — Michael Forrest
(74) *Attorney, Agent, or Firm* — Millen, White, Zelano & Branigan, PC; Ryan Pool

(57) ABSTRACT

The invention relates to a photocatalytic carbon dioxide reduction method carried out in liquid and/or gas phase under irradiation, using a photocatalyst containing a first semiconductor, particles comprising one or more metallic-state elements M, and a second semiconductor SC, wherein the method is carried out by contacting a feedstock containing the $CO_2$ and at least one sacrificial compound with the photocatalyst, then irradiating the photocatalyst such that the $CO_2$ is reduced, and oxidising the sacrificial compound in order to produce an effluent containing at least in part C1 or above carbon molecules other than $CO_2$.

11 Claims, No Drawings

PHOTOCATALYTIC CARBON DIOXIDE REDUCTION METHOD USING A PHOTOCATALYST IN THE FORM OF A POROUS MONOLITH

TECHNICAL FIELD OF THE INVENTION

The field of the invention is that of the photocatalytic reduction of carbon dioxide ($CO_2$) under irradiation by using a photocatalyst.

PRIOR ART

Fossil fuels, such as coal, oil and natural gas, are the main conventional sources of energy worldwide because of their availability, their stability and their high energy density. However, their combustion produces carbon dioxide emissions which are considered to be the principal cause of global warming. Thus, there is an increasing need to reduce $CO_2$ emissions, either by capturing the $CO_2$ or by converting it.

Although "passive" carbon capture and sequestration (CCS) is generally considered to be an efficient process for reducing $CO_2$ emissions, other strategies can be envisioned, in particular "active" strategies of conversion of $CO_2$ into products which have an economic value, such as industrial fuels and chemical products.

Such a strategy is based on the reduction of carbon dioxide to exploitable products.

The carbon dioxide reduction can be carried out biologically, thermally, electrochemically or else photocatalytically.

Among these options, photocatalytic $CO_2$ reduction is gaining increased attention since it can potentially consume alternative forms of energy, for example by exploiting solar energy, which is abundant, cheap and ecologically clean and safe.

Photocatalytic carbon dioxide reduction makes it possible to obtain $C_1$ or higher carbon-based molecules, such as CO, methane, methanol, ethanol, formaldehyde, formic acid or else other molecules such as carboxylic acids, aldehydes, ketones or various alcohols. These molecules, such as methanol, ethanol, formic acid or else methane and all $C_1^+$ hydrocarbons can be directly useful in terms of energy. Carbon monoxide CO can also be exploited for energy purposes as a mixture with hydrogen for the formation of fuels by Fischer-Tropsch synthesis. Carboxylic acid molecules, aldehyde molecules, ketone molecules or molecules of various alcohols can, for their part, have uses in chemistry or petrochemistry processes. All these molecules are thus of great interest from an industrial point of view.

Processes for photocatalytic carbon dioxide reduction in the presence of a sacrificial compound are known in the prior art.

Halmann et al. (Solar Energy, 31, 4, 429-431, 1983) have evaluated the performance levels of three semiconductors ($TiO_2$, $SrTiO_3$ and $CaTiO_3$) for the photocatalytic reduction of $CO_2$ in an aqueous medium. They observe the production of formaldehyde, formic acid and methanol.

Anpo et al. (J. Phys. Chem. B, 101, p. 2632-2636, 1997) have studied the photocatalytic reduction of $CO_2$ with water vapor on $TiO_2$-based photocatalysts anchored in zeolite micropores. Said photocatalysts exhibit a very high selectivity for gaseous methanol.

$TiO_2$-based photocatalysts on which platinum nanoparticles are deposited are known to convert, into methane, a mixture of $CO_2$ and $H_2O$ in the gas phase (Q-H. Zhang et al., Catal. Today, 148, p. 335-340, 2009).

$TiO_2$-based photocatalysts loaded with gold nanoparticles are also known from the literature for the photocatalytic reduction of $CO_2$ in the gas phase (S. C. Roy et al., ACS Nano, 4, 3, p. 1259-1278, 2010) and in the aqueous phase (W. Hou et al., ACS Catal., 1, p. 929-936, 2011).

It is also known that the photocatalytic reduction of $CO_2$ to methanol, formic acid and formaldehyde in an aqueous solution can be carried out using various semiconductors such as ZnO, CdS, GaP, SiC or else $WO_3$ (T. Inoue et al., Nature, 277, p. 637-638, 1979).

Liou et al. (Energy Environ. Sci., 4, p. 1487-1494, 2011) have used NiO-doped $InTaO_4$ photocatalysts to reduce $CO_2$ to $CH_3OH$.

Sato et al. (JACS, 133, p. 15240-15243, 2011) have studied a hybrid system alloying a p-type InP semiconductor and a polymer complexed with ruthenium in order to perform a selective reduction of $CO_2$.

Finally, a review and book chapter from the open literature offer an exhaustive summary of the photocatalysts used in photocatalytic carbon dioxide reduction: on the one hand, M. Tahir, N. S. Amin, Energy Conv. Manag., 76, p. 194-214, 2013 and, on the other hand, Photocatalysis, Topics in current chemistry, 303, C. A. Bignozzi (Editor), Springer, p. 151-184, 2011.

The object of the invention is to provide a new, long-lasting and more effective route of production of carbon-based molecules that can be exploited by photocatalytic carbon dioxide conversion by means of electromagnetic energy, using a photocatalyst in the form of porous monoliths containing at least one semiconductor. The use of photocatalysts of this type for photocatalytic $CO_2$ reduction makes it possible to achieve improved performance levels compared with the known implementations for this reaction. Indeed, it is known from J. M. Herrmann, Topics in Catalysis Vol. 34, p. 1-4, 2005 that the photocatalytic activity per unit of irradiated surface increases with the weight of photocatalyst then reaches a plateau. Surprisingly, the use of a photocatalyst in the form of a porous monolith containing at least one semiconductor for photocatalytic carbon dioxide reduction makes it possible to increase the activity per unit of irradiated surface by increasing the weight of photocatalyst, which is not the case for other forms (powder for example).

A patent application WO 2015/11072 describes the use of a material based on N—$TiO_2$ in the form of a porous monolith as a photocatalyst for the degradation of pollutants in the air or in water under radiation in the visible spectrum or for the cracking of water to $H_2$ under radiation in the visible spectrum. Document FR 2975309 describes a method of preparing a porous monolith containing $TiO_2$ and the use thereof as a photocatalyst for the degradation of pollutants in the air or in water under irradiation.

It is also known, from M. Tahir and N. S. Amin (Appl. Catal. A: General 467 (2013) 483-496 and Chem. Eng. J., 230 (2013) 314-327), to use a monolith of "honeycomb" type containing channels of millimetric size coated with a semiconductive compound for photocatalytic $CO_2$ reduction. Nevertheless, this type of object has a high density per unit volume (of about from 0.8 to 0.9 g/ml) which has not made it possible to obtain large specific surface areas.

However, no document discloses the use of a photocatalyst in the form of a porous monolith containing at least one semiconductor, in a photocatalytic carbon dioxide reduction process.

SUBJECTS OF THE INVENTION

The present invention relates to a photocatalytic carbon dioxide reduction process carried out in the liquid phase and/or in the gas phase under irradiation using a photocatalyst in the form of a porous monolith containing at least one semiconductor. Said process comprises more particularly the following steps:

a) a feedstock containing carbon dioxide and at least one sacrificial compound is brought into contact with a photocatalyst which is in the form of a porous monolith comprising a bulk density of less than or equal to 0.25 g/ml;

b) the photocatalyst is irradiated with at least one irradiation source producing at least one wavelength lower than the bandgap of the photocatalyst so as to reduce the carbon dioxide and to oxidize the sacrificial compound in the presence of said photocatalyst activated by said irradiation source, so as to produce an effluent containing at least in part C1 or higher carbon-based molecules other than $CO_2$.

The bulk density is calculated by taking the ratio of the weight of catalyst to its geometric volume.

According to one variant, and when the process is carried out in the gas phase, the sacrificial compound is a gaseous compound chosen from water, aqueous ammonia, hydrogen, methane and an alcohol.

According to one variant, and when the process is carried out in the liquid phase, the sacrificial compound is a compound that is soluble in the liquid phase chosen from water, aqueous ammonia, an alcohol, an aldehyde or an amine.

According to one variant, a diluent fluid is present in steps a) and/or b).

According to one variant, the irradiation source is an artificial or natural irradiation source.

According to one variant, said photocatalyst in the form of a porous monolith has a mesoporous volume, of which the pore diameter is greater than 0.2 nm and less than or equal to 50 nm, of between 0.01 and 1 ml/g, preferably between 0.05 and 0.5 ml/g.

According to one variant, said photocatalyst in the form of a porous monolith has a type-I macroporous volume, i.e. a macroporous volume of which the diameter of the pores is greater than 50 nm and less than or equal to 1000 nm (1 µm), of between 0.1 and 3 ml/g, preferably between 0.2 and 2.5 ml/g.

According to one variant, said photocatalyst in the form of a porous monolith has a type-II macroporous volume, i.e. a macroporous volume of which the diameter of the pores is greater than 1 µm and less than or equal to 10 µm, of between 0.1 and 8 ml/g for a diameter, preferably between 0.5 and 8 ml/g.

According to one preferred variant, said photocatalyst in the form of a porous monolith has a mesoporosity and/or a type-I macroporosity and/or a type-II macroporosity.

According to one variant, said photocatalyst in the form of a porous monolith also has a macroporous volume, of which the pore diameter is greater than 10 µm, of less than 0.5 ml/g.

According to one preferred variant, said photocatalyst in the form of a porous monolith has a bulk density of between 0.05 and 0.5 g/ml.

The macroporous and mesoporous volumes are measured by mercury intrusion porosimetry according to standard ASTM D4284-83 at a maximum pressure of 4000 bar, using a surface tension of 484 dynes/cm and a contact angle of 140°.

According to one variant, said photocatalyst in the form of a mesoporous monolith has a specific surface area (measured according to standard ASTM D 3663-78 established from the Brunauer, Emmett, Teller method, i.e. BET method, as defined in S. Brunauer, P. H. Emmett, E. Teller, J. Am. Chem. Soc., 1938, 60 (2), pp 309-319) of between 10 and 1000 $m^2/g$, preferably between 50 and 600 $m^2/g$.

According to one variant, said photocatalyst in the form of a porous monolith comprises at least one semiconductor diluted within at least one inorganic phase not absorbing photons with an energy greater than 4 eV. Preferably, the inorganic phase contains silica or alumina.

According to one preferred embodiment, the photocatalyst in monolith form is constituted by the semiconductor.

According to one preferred variant, when said photocatalyst in the form of a porous monolith comprises at least one semiconductor dispersed within at least one inorganic phase not absorbing photons with an energy greater than 4 eV, the semiconductor content is between 5% and 70% by weight relative to the total weight of the photocatalyst.

According to one variant, said photocatalyst may contain at least one element M chosen from an element of groups VIIIB, IB and IIIA of the periodic table of elements in the metal state. Preferably, the content of element(s) M in the metal state is between 0.001% and 20% by weight relative to the total weight of the photocatalyst.

Preferably, the semiconductor of said photocatalyst is chosen from $TiO_2$, $ZnO$, $Cu_2O$, $CuO$, $Ce_2O_3$, $CeO_2$, $In_2O_3$, $SiC$, $ZnS$ and $In_2S_3$, alone or as a mixture.

DETAILED DESCRIPTION OF THE INVENTION

Definitions

In the remainder of the text, the groups of chemical elements are given according to the CAS classification (CRC Handbook of Chemistry and Physics, published by CRC Press, editor-in-chief D. R. Lide, $81^{st}$ edition, 2000-2001). For example, group VIII according to the CAS classification corresponds to the metals of columns 8, 9 and 10 according to the new IUPAC classification.

The term "sacrificial compound" is intended to mean an oxidizable compound. The sacrificial compound may be in gas or liquid form.

The term "C1 or higher carbon-based molecules" is intended to mean molecules resulting from the reduction of $CO_2$ containing one or more carbon atoms, with the exception of $CO_2$. Such molecules are, for example, CO, methane, methanol, ethanol, formaldehyde, formic acid or else other molecules such as hydrocarbons, carboxylic acids, aldehydes, ketones or various alcohols.

In the present description, according to IUPAC convention, the term "micropores" is intended to mean pores of which the diameter is less than 2 nm; "mesopores" is intended to mean pores of which the diameter is greater than 2 nm and less than or equal to 50 nm and "macropores" is intended to mean pores of which the diameter is greater than 50 nm, and more particularly "type-I macropores" is intended to mean pores of which the diameter is greater than 50 nm and less than or equal to 1000 nm (1 µm), and "type-II macropores" is intended to mean pores of which the diameter is greater than 1 µm and less than or equal to 10 µm.

Description

A subject of the present invention is a photocatalytic carbon dioxide reduction process carried out in the liquid phase and/or in the gas phase under irradiation using a photocatalyst in the form of a porous monolith containing at least one semiconductor, which process comprises the following steps:

a) a feedstock containing carbon dioxide and at least one sacrificial compound is brought into contact with a photocatalyst which is in the form of a porous monolith comprising a bulk density of less than or equal to 0.25 g/ml;

b) the photocatalyst is irradiated with at least one irradiation source producing at least one wavelength lower than the bandgap of said photocatalyst so as to reduce the carbon dioxide and to oxidize the sacrificial compound in the presence of said photocatalyst activated by said irradiation source, so as to produce an effluent containing at least in part C1 or higher carbon-based molecules other than $CO_2$.

According to step a) of the process according to the invention, a feedstock containing said carbon dioxide and at least one sacrificial compound is brought into contact with said photocatalyst.

The process according to the invention can be carried out in the liquid phase and/or in the gas phase.

The feedstock treated according to the process is in gas, liquid or two-phase gas and liquid form.

When the feedstock is in gas form, the $CO_2$ is present in its gas form in the presence of any gaseous sacrificial compounds alone or as a mixture. The gaseous sacrificial compounds are oxidizable compounds, such as water ($H_2O$), hydrogen ($H_2$), methane ($CH_4$) or else alcohols. Preferably, the gaseous sacrificial compounds are water or hydrogen. When the feedstock is in gas form, the $CO_2$ and the sacrificial compound can be diluted with a gaseous diluent fluid such as $N_2$ or Ar.

When the feedstock is in liquid form, it can be in the form of an ionic, organic or aqueous liquid. The feedstock in liquid form is preferentially aqueous. In aqueous medium, the $CO_2$ is then dissolved in the form of aqueous carbonic acid ($H_2CO_3$), of hydrogen carbonate or of carbonate. The sacrificial compounds are liquid or solid oxidizable compounds that are soluble in the liquid feedstock, such as water ($H_2O$), alcohols, aldehydes or amines. Preferably, the sacrificial compound is water. When the liquid feedstock is an aqueous solution, the pH is generally between 1 and 9, preferably between 2 and 7. Optionally, and in order to modulate the pH of the aqueous liquid feedstock, a basic or acidic agent can be added to the feedstock. When a basic agent is introduced, it is preferably selected from alkali metal or alkaline-earth metal hydroxides, organic bases such as amines or aqueous ammonia. When an acidic agent is introduced, it is preferably selected from inorganic acids such as nitric acid, sulfuric acid, phosphoric acid, hydrochloric acid or hydrobromic acid, or organic acids such as carboxylic or sulfonic acids.

Optionally, when the liquid feedstock is aqueous, it may contain, in any amount, any solvated ion such as, for example, $K^+$, $Li^+$, $Na^+$, $Ca^{2+}$, $Mg^{2+}$, $SO_4^{2-}$, $Cl^-$, $F^-$ or $NO_3^{2-}$.

When the process is carried out in the liquid phase or in the gas phase, a diluent fluid, which is respectively liquid or gaseous, may be present in the reaction medium. The presence of a diluent fluid is not required for carrying out the invention; however, it may be useful to add said fluid to the feedstock to ensure the dispersion of the feedstock in the medium, the dispersion of the photocatalyst, control of the adsorption of the reagents/products at the surface of the photocatalyst, control of the absorption of photons by the photocatalyst, dilution of the products in order to limit the recombination thereof and other parasitic reactions of the same kind. The presence of a diluent fluid also makes it possible to control the temperature of the reaction medium that can thus compensate for the possible exo/endothermicity of the photocatalyzed fraction. The nature of the diluent fluid is chosen such that its influence is neutral on the reaction medium or that its possible reaction is not detrimental to the performing of the desired carbon dioxide reduction. By way of example, nitrogen may be chosen as gaseous diluent fluid.

The feedstock containing the carbon dioxide can be brought into contact with the photocatalyst by any means known to those skilled in the art. Preferably, the carbon dioxide feedstock and the photocatalyst are brought into contact in a flow-through fixed bed or in a swept fixed bed.

When the implementation is in a flow-through fixed bed, said photocatalyst is preferentially fixed within the reactor, and the feedstock containing the carbon dioxide to be converted in gas and/or liquid form is sent through the photocatalytic bed.

When the implementation is in a swept fixed bed, the photocatalyst is preferentially fixed within the reactor and the feedstock containing the carbon dioxide to be converted in gas and/or liquid form is sent over the photocatalytic bed.

When the implementation is in a fixed bed or in a swept bed, the implementation can be carried out continuously.

The photocatalyst in the form of a porous monolith comprises at least one semiconductor.

The use of this type of monolith photocatalyst in a photocatalytic $CO_2$ reduction reaction makes it possible, surprisingly, to obtain improved photocatalytic performance levels compared with the photocatalysts known from the prior art which are not in the form of a porous monolith.

The constituent semiconductor(s) of said photocatalyst are independently chosen from inorganic, organic or organic-inorganic semiconductors. The bandgap of inorganic, organic or organic-inorganic hybrid semiconductors is generally between 0.1 and 4.0 eV.

According to a first variant, an inorganic semiconductor may be chosen from one or more elements of group IVA, such as silicon, germanium, silicon carbide or silicon-germanium. They may also be composed of elements of groups IIIA and VA, such as GaP, GaN, InP and InGaAs, or elements of groups IIB and VIA, such as CdS, ZnO and ZnS, or elements of groups IB and VIIA, such as CuCl and AgBr, or elements of groups IVA and VIA, such as PbS, PbO, SnS and PbSnTe, or elements of groups VA and VIA, such as $Bi_2Te_3$ and $Bi_2O_3$, or elements of groups IIB and VA, such as $Cd_3P_2$, $Zn_3P_2$ and $Zn_3As_2$, or elements of groups IB and VIA, such as CuO, $Cu_2O$ and $Ag_2S$, or elements of groups VIIIB and VIA, such as CoO, PdO, $Fe_2O_3$ and NiO, or elements of groups VIB and VIA, such as $MoS_2$ and $WO_3$, or elements of groups VB and VIA, such as $V_2O_5$ and $Nb_2O_5$, or elements of groups IVB and VIA, such as $TiO_2$ and $HfS_2$, or elements of groups IIIA and VIA, such as $In_2O_3$ and $In_2S_3$, or elements of group VIA and of the lanthanide group, such as $Ce_2O_3$, $Pr_2O_3$, $Sm_2S_3$, $Tb_2S_3$ and $La_2S_3$, or elements of group VIA and the actinide group, such as $UO_2$ and $UO_3$.

Preferably, a semiconductor is chosen from $TiO_2$, ZnO, $Cu_2O$, CuO, $Ce_2O_3$, $CeO_2$, $In_2O_3$, SiC, ZnS, and $In_2Sn_3$, alone or as a mixture.

The semiconductor may optionally be doped with one or more elements chosen from metal elements, such as for example elements V, Ni, Cr, Mo, Fe, Sn, Mn, Co, Re, Nb, Sb, La, Ce, Ta, Ti, non-metal elements, such as for example C, N, S, F, P, or of a mixture of metal and non-metal elements.

According to another variant, a semiconductor is chosen from organic semiconductors. Said organic semiconductors will be tetracene, anthracene, polythio-phene, polystyrene sulfonate, phosphyrenes and fullerenes.

According to another variant, a semiconductor is chosen from organic-inorganic semiconductors. Among organic-inorganic semiconductors, mention may be made of crystalline solids of MOF (Metal Organic Framework) type. MOFs consist of inorganic subunits (transition metals, lanthanides, etc.) connected to one another by organic ligands (carboxylates, phosphonates, imidazolates, etc.), thus defining crystalline, sometimes porous, hybrid networks.

According to another variant, a semiconductor may be surface-sensitized with any organic molecules capable of absorbing photons.

According to one variant, said photocatalyst in the form of a porous monolith is constituted by the semiconductor in monolith form.

According to one variant, said photocatalyst in the form of a porous monolith comprises at least one semiconductor dispersed within at least one inorganic phase not absorbing photons with an energy greater than 4 eV. Preferably, the diluting inorganic phase contains silica or alumina.

According to one preferred variant, when said photocatalyst in the form of a porous monolith comprises at least one semiconductor diluted within at least one inorganic phase not absorbing photons with an energy greater than 4 eV, the semiconductor content is between 5% and 70% by weight relative to the total weight of the photocatalyst.

According to one variant, said photocatalyst may contain at least one element M chosen from an element of groups VIIIB, IB and IIIA of the periodic table of the elements in the metal state. The term "element in the metal state" is intended to mean an element which is in the zero oxidation state (and thus in metal form). Preferably, the content of element(s) M in the metal state is between 0.001% and 20% by weight relative to the total weight of the photocatalyst.

According to one variant, said photocatalyst in the form of a porous monolith has a mesoporous volume, of which the pore diameter is greater than 0.2 nm and less than or equal to 50 nm, of between 0.01 and 1 ml/g, preferably between 0.05 and 0.5 ml/g.

According to one variant, said photocatalyst in the form of a porous monolith has a type-I macroporous volume, i.e. a macroporous volume, of which the diameter of the pores is greater than 50 nm and less than or equal to 100 nm (1 μm), of between 0.1 and 3 ml/g, preferably between 0.2 and 2.5 ml/g.

According to one variant, said photocatalyst in the form of a porous monolith has a type-II macroporous volume, i.e. a macroporous volume, of which the diameter of the pores is greater than 1 μm and less than or equal to 10 μm, of between 0.1 and 8 ml/g for a diameter, preferably between 0.5 and 8 ml/g.

According to one preferred variant, said photocatalyst in the form of a porous monolith has a mesoporosity and/or a type-I macroporosity and/or a type-II macroporosity.

According to one variant, said photocatalyst in the form of a porous monolith also has a macroporous volume, the pore diameter of which is greater than 10 μm, of less than 0.5 ml/g.

According to one preferred variant, said photocatalyst in the form of a porous monolith has a bulk density between 0.05 and 0.5 g/ml. Bulk density is calculated by taking the ratio of the weight of catalyst to its geometric volume.

According to one variant, said photocatalyst in the form of a porous monolith has a BET surface area of between 10 and 1000 m$^2$/g, preferably between 50 and 600 m$^2$/g.

The process for preparing the photocatalyst may be any preparation process known to those skilled in the art and suitable for the desired photocatalyst.

According to one variant, the process for preparing the photocatalyst comprises the following steps:

1) a solution containing a surfactant is mixed with an acid solution;
2) at least one soluble precursor of an inorganic support not absorbing photons with an energy greater than 4 eV or a precursor of an inorganic semiconductor absorbing photons with an energy of between 0.1 and 4 eV is added to the solution obtained in step 1);
3) optionally, at least one liquid organic compound, which is immiscible in the solution obtained in step 2) is added to the solution obtained in step 2) so as to form an emulsion;
4) the solution obtained in step 2) or the emulsion obtained in step 3) is left to mature in the wet state so as to obtain a gel;
5) the gel obtained in step 4) is washed with an organic solution;
6) the gel obtained in step 5) is dried and calcined so as to obtain a porous monolith;
7) a solution comprising at least one soluble precursor of a semiconductor is impregnated in the porosity of the porous monolith obtained in step 6) when, in step 2), at least one soluble precursor of an inorganic support not absorbing photons with an energy greater than 4 eV is added to the solution obtained in step 1), or a solution comprising at least one soluble precursor of a semiconductor is optionally impregnated in the porosity of the porous monolith obtained in step 6) when, in step 2), at least one precursor of an inorganic semiconductor absorbing photons with an energy of between 0.1 and 4 eV is added to the solution obtained in step 1), said precursor being identical to or different than said molecular precursor introduced in step 2);
8) optionally, the product obtained in step 7) is dried and calcined so as to obtain a porous monolith.

The steps are described in detail hereinafter.

Step 1)

During step 1) of the process for preparing the photocatalyst, a solution containing a surfactant is mixed with an acidic aqueous solution so as to obtain an acidic aqueous solution comprising a surfactant.

The surfactant may be anionic, cationic, amphoteric or nonionic; preferably, the surfactant is a polyethylene glycol), cetyltrimethylammonium bromide or myristyltrimethylammonium bromide. The acidic agent is preferably selected from inorganic acids such as nitric acid, sulfuric acid, phosphoric acid, hydrochloric acid or hydrobromic acid, or organic acids such as carboxylic or sulfonic acids, alone or as a mixture. The pH of the mixture is preferably less than 4.

Step 2)

During step 2) of the process for preparing the photocatalyst, at least one soluble precursor of an inorganic support not absorbing photons with an energy greater than 4 eV or a precursor of an inorganic semiconductor absorbing photons with an energy of between 0.1 and 4 eV is added.

When the molecular precursor is a precursor of an inorganic support not absorbing photons with an energy greater than 4 eV, a precursor of alkoxide type is preferably chosen from aluminum isopropoxide, aluminum tert-butoxide, tetraethyl orthosilicate or tetramethyl orthosilicate, alone or as a mixture.

When the molecular precursor is a precursor of an inorganic semiconductor absorbing photons with an energy of between 0.1 and 4 eV, an alkoxide precursor is preferably chosen from titanium isopropoxide or tetraethyl orthotitanate, alone or as a mixture.

Optionally, it is possible to add, to the alkoxide precursor of an inorganic support and/or semiconductor, another precursor of an inorganic semiconductor of ionic or colloidal sol type.

Preferably, the precursors/surfactant weight ratio is between 0.1 and 10.

Step 3) [Optional]

During step 3), at least one liquid organic compound, which is immiscible with the solution obtained in step 2), is added to the solution obtained in step 2) so as to form an emulsion.

Preferably, the liquid organic compound is a hydrocarbon, or a mixture of hydrocarbons, having 5 to 15 carbon atoms. Preferably, the weight ratio of liquid organic compound/solution obtained in step 2) is between 0.2 and 5.

Step 4)

During step 4), the solution obtained in step 2) or the emulsion obtained in step 3) is left to mature in the wet state so as to obtain a gel.

Preferably, the maturation is carried out at a temperature between 5 and 80° C. Preferably, the maturation is carried out for 1 to 30 days.

Step 5)

During step 5), the gel obtained in step 4) is washed with an organic solution.

Preferably, the organic solution is acetone, ethanol, methanol, isopropanol, tetrahydrofuran, ethyl acetate or methyl acetate, alone or as a mixture. Preferably, the washing step is repeated several times.

Step 6)

During step 6), the gel obtained in step 5) is dried and calcined so as to obtain a porous monolith.

Preferably, the drying is carried out at a temperature between 5 and 80° C.

Preferably, the drying is carried out for 1 to 30 days. Optionally, absorbent paper can be used to accelerate the drying of the materials.

Preferably, the calcining is carried out in two steps: a first temperature stationary phase between 120 and 250° C. for 1 to 10 hours, then a second temperature stationary phase between 300 and 950° C. for 2 to 24 hours.

Step 7)

During step 7), a solution comprising at least one soluble precursor of a semiconductor is impregnated in the porosity of the porous monolith obtained in step 6) when, in step 2), at least one soluble precursor of an inorganic support not absorbing photons with an energy greater than 4 eV is added to the solution obtained in step 1), or a solution comprising at least one soluble precursor of a semiconductor is optionally impregnated in the porosity of the porous monolith obtained in step 6) when, in step 2), at least one precursor of an inorganic semiconductor absorbing photons with an energy of between 0.1 and 4 eV is added to the solution obtained in step 1), said precursor being identical to or different than said molecular precursor introduced in step 2).

Preferably, a step of maturation under a humid atmosphere is carried out after the impregnation.

Preferably, a drying step is then carried out at a temperature of between 5 and 80° C. and for 0.5 to 30 days.

Preferably, a step of calcining under air is then carried out with a first temperature stationary phase between 80 and 150° C. for 1 to 10 hours, then a second temperature stationary phase between 150° C. and 250° C. for 1 to 10 hours and, finally, a third temperature stationary phase between 300 and 950° C. for 0.5 to 24 hours.

Step 8) [Optional Step]

During step 8), the product obtained in step 7) is dried and calcined so as to obtain a porous monolith.

The precursor may be in a form that is dissolved in solution or in the form of a colloidal sol.

Preferably, a drying step is then carried out at a temperature of between 5 and 120° C. and for 0.5 to 2 days.

Preferably, a step of calcining under air is then carried out with a first temperature stationary phase between 120 and 250° C. for 0.5 to 10 hours, then a second temperature stationary phase between 300 and 950° C. for 0.5 to 24 hours.

Preferably, a step of reduction under a hydrogen stream at a temperature of between 100 and 600° C., for 0.5 to 24 h, is then carried out.

Step b) of the Process According to the Invention

According to step b) of the process according to the invention, the photocatalyst is irradiated using at least one irradiation source producing at least one wavelength lower than the bandgap of said photocatalyst so as to reduce the carbon dioxide and to oxidize the sacrificial compound in the presence of said photocatalyst activated by said irradiation source, so as to produce an effluent containing at least in part C1 or higher carbon-based molecules other than $CO_2$.

Photocatalysis is based on the principle of activation of a semiconductor or of a set of semiconductors, such as the photocatalyst used in the process according to the invention, by means of the energy introduced by the irradiation. Photocatalysis can be defined as the absorption of a photon, the energy of which is greater than or equal to the bandgap between the valence band and the conduction band, which induces the formation of an electron-hole pair in the semiconductor. There is thus excitation of an electron at the level of the conduction band and formation of a hole on the valence band. This electron-hole pair will allow the formation of free radicals that will either react with compounds present in the medium or else recombine according to various mechanisms. Each semiconductor has an energy difference between its conduction band and its valence band, or "bandgap", which is specific to said semiconductor.

A photocatalyst composed of one or more semiconductors can be activated by the absorption of at least one photon. Absorbable photons are those of which the energy is greater than the bandgap of the semiconductors. In other words, photocatalysts can be activated by at least one photon having a wavelength corresponding to the energy associated with the bandgaps of the semiconductors constituting the photocatalyst or having a lower wavelength. The maximum wavelength absorbable by a semiconductor is calculated using the following equation:

$$\lambda_{max} = \frac{h \times c}{E_g}$$

with $\lambda_{max}$ the maximum wavelength absorbable by a semiconductor (in m), h the Planck constant ($4.13433559 \times 10^{-15}$ eV·s), c the speed of light in a vacuum (299 792 458 m·s$^{-1}$) and Eg the bandgap of the semiconductor (in eV).

Any irradiation source which emits at least one wavelength suitable for the activation of said photocatalyst, that is to say which is absorbable by the photocatalyst, can be used according to the invention. Use may for example be made of natural solar irradiation or an artificial source of irradiation of laser, Hg, incandescent lamp, fluorescent tube, plasma or light-emitting diode (LED) type. Preferably, the irradiation source is solar irradiation.

The irradiation source produces radiation of which at least a portion of the wavelengths is lower than the maximum wavelength ($\lambda_{max}$) absorbable by the constituent semiconductor(s) of the photocatalyst according to the invention. When the irradiation source is solar irradiation, it generally emits in the ultraviolet, visible and infrared spectra, that is to say it emits a wavelength range from 280 nm to 2500 nm approximately (according to standard ASTM G173-03). Preferably, the source emits at least in a wavelength range greater than 280 nm, very preferably from 315 nm to 800 nm, which includes the UV spectrum and/or the visible spectrum.

The irradiation source provides a stream of photons which irradiates the reaction medium containing the photocatalyst. The interface between the reaction medium and the light source varies as a function of the applications and of the nature of the light source.

In one preferred mode, when it is a question of solar irradiation, the irradiation source is located outside the reactor and the interface between the two may be an optical window made of Pyrex, of quartz, of organic glass or any other interface which allows photons absorbable by the photocatalyst according to the invention to diffuse from the outside medium into the reactor.

The performing of the photocatalytic carbon dioxide reduction is conditioned by the provision of photons suitable for the photocatalytic system for the envisioned reaction and, as a result, is not limited to a specific pressure or temperature range apart from those which make it possible to ensure the stability of the product(s). The temperature range employed for the photocatalytic reduction of the feedstock containing carbon dioxide is generally from −10° C. to +200° C., preferably from 0 to 150° C., and very preferably from 0 to 100° C. The pressure range employed for the photocatalytic reduction of the feedstock containing carbon dioxide is generally from 0.01 MPa to 70 MPa (0.1 to 700 bar), preferably from 0.1 MPa to 2 MPa (1 to 20 bar).

The effluent obtained after the photocatalytic carbon dioxide reduction reaction contains, on the one hand, at least one C1 or higher molecule other than the carbon dioxide resulting from the reaction and, on the other hand, unreacted feedstock, and also the optional diluent fluid, but also parallel reaction products such as, for example, dihydrogen resulting from the photocatalytic reduction of $H_2O$ when this compound is used as sacrificial compound.

The following examples illustrate the invention without limiting the scope thereof.

EXAMPLES

Example 1: Photocatalyst A (not in Accordance with the Invention) Powdered $TiO_2$ The photocatalyst A is a commercial $TiO_2$-based semiconductor in powder form (Aeroxide® P25, Aldrich™, purity >99.5%). The particle size of the photocatalyst is 21 nm and its specific surface area is 52 m$^2$/g.

Example 2: Photocatalyst B (not in Accordance with the Invention) $CeO_2$

The photocatalyst B is a commercial $CeO_2$-based semiconductor in powder form (Aldrich™, purity 99.95%). The particle size of the photocatalyst is less than 50 nm and its specific surface area is 30 m$^2$/g.

Example 3: Photocatalyst C (in Accordance with the Invention) $TiO_2$ Monolith 1 g of polyethylene glycol (Aldrich™, $M_w$=20 000) is added to 2 ml of distilled water then mixed with 1 ml of a hydrochloric acid solution (37% by weight, Aldrich™, purity 97%). 1.1 g of titanium isopropoxide (Aldrich™, purity 97%) is added to the mixture and the resulting mixture is stirred until an apparently single-phase mixture is obtained.

The mixture is then poured into a Petri dish with an internal diameter of 5.5 cm, which is placed in a saturator for 7 days for gelling.

The gel obtained is then washed with isopropanol (Aldrich™, purity >99.5%) two consecutive times, then dried at ambient temperature for 2 days. Finally, the gel is calcined under air in a muffle furnace at 180° C. for 2 h, then at 350° C. for 6 h.

The photocatalyst C is then obtained in the form of a $TiO_2$-based porous monolith.

The photocatalyst C has a mesoporous volume of 0.16 ml/g, a type-I macroporous volume of 0.19 ml/g and a type-II macroporous volume of 2.3 ml/g. The photocatalyst C has a specific surface area of 64 m$^2$/g.

The photocatalyst C has a bulk density of 0.23 g/ml.

Example 4: Photocatalyst D (in Accordance with the Invention) $TiO_2/SiO_2$ Monolith 1.12 g of myristyltrimethylammonium bromide (Aldrich™, purity >99%) is added to 2 ml of distilled water and mixed with 1 ml of a hydrochloric acid solution (37% by weight, Aldrich™, purity 97%). 0.18 g of titanium isopropoxide (Aldrich™, purity 97%) and 1.02 g of tetraethyl orthosilicate (Aldrich™, purity >99%) are added to the mixture and the resulting mixture is stirred until an apparently single-phase mixture is obtained.

7 g of dodecane (Aldrich™, purity >99%) are slowly introduced into the mixture with stirring until an emulsion is formed.

The emulsion is then poured into a Petri dish with a 5.5 cm internal diameter, which is placed in a saturator for 7 days for gelling.

The gel obtained is then washed a first time with anhydrous tetrahydrofuran (Aldrich™, purity >99%), then with an anhydrous tetrahydrofuran/acetone mixture (VWR™, ACS grade) at 70/30 by volume, twice successively.

The gel is then dried at ambient temperature for 7 days. Finally, the gel is calcined under air in a muffle furnace at 180° C. for 2 h, then at 800° C. for 5 h. The photocatalyst D is then obtained in the form of a porous monolith comprising $TiO_2$ in an $SiO_2$ matrix.

The photocatalyst D has a mesoporous volume of 0.11 ml/g, a type-I macroporous volume of 0.74 ml/g and a type-II macroporous volume of 6.4 ml/g. The photocatalyst D has a specific surface area of 82 m$^2$/g. The content of Ti element measured by ICP-AES is 9.18% by weight, which is equivalent to 15.3% by weight of the $TiO_2$ semiconductor in the photocatalyst D.

The photocatalyst D has a bulk density of 0.11 g/ml.

Example 5: Photocatalyst E (in Accordance with the Invention) $TiO_2/SiO_2$ Monolith 1.12 g of myristyltrimethylammonium bromide (Aldrich™, purity >99%) is added to 2 ml of distilled water then mixed with 1 ml of a hydrochloric acid solution (37% by weight, Aldrich™, purity 97%). 1.02 g of tetraethyl orthosilicate (Aldrich™, purity >99%) is added to the mixture and the resulting mixture is stirred until an apparently single-phase mixture is obtained.

7 g of dodecane (Aldrich™, purity >99%) are slowly introduced into the mixture with stirring until an emulsion has formed.

The emulsion is then poured into a Petri dish with a 5.5 cm internal diameter, which is placed in a saturator for 7 days for gelling.

The gel obtained is then washed a first time with anhydrous tetrahydrofuran (Aldrich™, purity >99%), then with an anhydrous tetrahydrofuran/acetone mixture (VWR™, ACS grade) at 70/30 by volume, twice successively.

The gel is then dried at ambient temperature for 7 days. Finally, the gel is calcined under air in a muffle furnace at 180° C. for 2 h, then at 650° C. for 5 h. An $SiO_2$-based porous monolith is then obtained.

A solution containing 34 ml of distilled water, 44.75 ml of isopropanol (Aldrich™, purity >99.5%), 10.74 ml of hydrochloric acid (37% by weight, Aldrich™, purity 97%) and 10.50 ml of titanium isopropoxide (Aldrich™, purity 97%) is prepared with stirring. A portion of this solution corresponding to the pore volume is impregnated into the porosity of the monolith, then left to mature for 12 h. The monolith is then dried under ambient atmosphere for 24 h. The step is repeated a second time. Finally, the monolith is calcined under air in a muffle furnace at 120° C. for 2 h, then at 180° C. for 2 h and, finally, at 400° C. for 1 h. A porous monolith comprising $TiO_2$ in an $SiO_2$ matrix is then obtained.

The photocatalyst E has a mesoporous volume of 0.20 ml/g, a type-I macroporous volume of 1.15 ml/g and a type-II macroporous volume of 5.8 ml/g. The photocatalyst E has a specific surface area of 212 $m^2/g$. The content of Ti element measured by ICP-AES is 27.35% by weight, which is equivalent to 52.1% by weight of $TiO_2$ in the photocatalyst E.

The photocatalyst E has a bulk density of 0.14 g/ml.

Example 6: Photocatalyst F (in Accordance with the Invention) $CeO_2/SiO_2$ 1.12 g of myristyltrimethylammonium bromide (Aldrich™, purity >99%) is added to 2 ml of distilled water then mixed with 1 ml of a hydrochloric acid solution (37% by weight, Aldrich™, purity 97%). 1.02 g of tetraethyl orthosilicate (Aldrich™, purity >99%) is added to the mixture and the resulting mixture is stirred until an apparently single-phase mixture is obtained.

7 g of dodecane (Aldrich™, purity >99%) are slowly introduced into the mixture with stirring until an emulsion has formed.

The emulsion is then poured into a Petri dish with a 5.5 cm internal diameter, which is placed in a saturator for 7 days for gelling.

The gel obtained is then washed a first time with an anhydrous tetrahydrofuran (Aldrich™, purity >99%), then with an anhydrous tetrahydrofuran/acetone mixture (VWR™, ACS grade) at 70/30 by volume, twice successively.

The gel is then dried at ambient temperature for 7 days. Finally, the gel is calcined under air in a muffle furnace at 180° C. for 2 h, then at 650° C. for 5 h. An $SiO_2$-based porous monolith is then obtained.

5.3 g of cerium nitrate hexahydrate (Aldrich™, purity 99%) are dissolved in 95 ml of distilled water with stirring. A portion of this solution corresponding to the pore volume is impregnated into the porosity of the monolith, then left to mature for 12 h. The monolith is then dried under ambient atmosphere for 24 h. Finally, the monolith is calcined under air in a muffle furnace at 120° C. for 2 h, then at 180° C. for 2 h and, finally, at 450° C. for 1 h. A porous monolith comprising $CeO_2$ in an $SiO_2$ matrix is then obtained.

The photocatalyst F has a mesoporous volume of 0.30 ml/g, a type-I macroporous volume of 1.34 ml/g and a type-II macroporous volume of 6.7 ml/g. The photocatalyst F has a specific surface area of 257 $m^2/g$. The content of Ce element measured by ICP-AES is 13.03% by weight, which is equivalent to 16.0% by weight of $CeO_2$ in the photocatalyst F.

The photocatalyst F has a bulk density of 0.14 g/ml.

Example 7: Use of the Photocatalysts in Gas-Phase Photocatalytic $CO_2$ Reduction The photocatalysts A, B, C, D, E and F are subjected to a gas-phase photocatalytic $CO_2$ reduction test in a flow-through bed continuous steel reactor fitted with an optical window made of quartz and a frit opposite the optical window on which the photocatalytic solid is deposited.

For the photocatalysts A and B, a sufficient amount of powder is deposited on the frit so as to cover the entire irradiated surface area of the reactor. For the photocatalysts C, D, E and F, the monoliths are just placed on the frit, their diameter being equal to the diameter of the reactor. The irradiated surface area for all the photocatalysts is $8.042477 \times 10^{-04}$ $m^2$. The tests are carried out at ambient temperature under atmospheric pressure. A $CO_2$ flow rate of 0.3 ml/min passes through a water saturator before being distributed into the reactor. The production of produced dihydrogen gas resulting from the undesirable photolytic reduction of the water entrained into the saturator and of $CH_4$ resulting from the carbon dioxide reduction are monitored by analysis of the effluent every 6 minutes by micro gas chromatography. The UV-visible irradiation source is provided by a Xe—Hg lamp (Asahi™, MAX302™). The irradiation power is always maintained at 80 $W/m^2$ for a wavelength range of between 315 and 400 nm. The duration of the test is 20 hours.

The photocatalytic activities are expressed in μmol of dihydrogen and of methane produced per hour and per $m^2$ irradiated. These are mean activities over the entire duration of the tests. The results are reported in table 1 (below).

TABLE 1

Performance levels of the photocatalysts relative to their mean activity for the production of dihydrogen or of methane from a mixture of $CO_2$ and $H_2O$ in the gas phase

| Photocatalyst | | Mean $CH_4$ activity (μmol/h/$m^2$) | Mean $H_2$ activity (μmol/h/$m^2$) |
|---|---|---|---|
| A (not in accordance) | $TiO_2$ | 1 | 21 |
| B (not in accordance) | $CeO_2$ | 3 | 7 |
| C (in accordance) | $TiO_2$ monolith | 56 | 10 |
| D (in accordance) | $TiO_2/SiO_2$ monolith | 17 | 8 |
| E (in accordance) | $TiO_2/SiO_2$ monolith | 93 | 13 |
| F (in accordance) | $CeO_2/SiO_2$ monolith | 78 | 6 |

The activity values show that the use of the solids according to the invention systematically exhibits the best photocatalytic performance levels and particularly better selectivities with respect to photocatalytic $CO_2$ reduction.

The invention claimed is:

1. A photocatalytic carbon dioxide reduction process carried out in the liquid phase and/or in the gas phase under irradiation using a photocatalyst in the form of a porous monolith containing at least one semiconductor, which process comprises the following steps:
   a) a feedstock containing carbon dioxide and at least one sacrificial compound is brought into contact with the photocatalyst which is in the form of a porous monolith comprising a bulk density of less than or equal to 0.25 g/ml;
   b) the photocatalyst is irradiated with at least one irradiation source producing at least one wavelength lower than the bandgap of said photocatalyst, said step b) being carried out at a temperature of between −10° C. and 200° C., and at a pressure of between 0.01 MPa and 70 MPa,
   wherein the photocatalyst in the form of a porous monolith has a mesoporous volume, of which the pore diameter is greater than 0.2 nm and less than or equal to 50 nm, of between 0.01 and 1 ml/g,
   wherein the photocatalyst in the form of a porous monolith has a type-I macroporous volume, of which the pore diameter is greater than 50 nm and less than or equal to 1000 nm, of between 0.1 and 3 ml/g, and
   wherein the photocatalyst in the form of a porous monolith has a type-II macroporous volume, of which the pore diameter is greater than 1 μm and less than or equal to 10 μm, of between 0.1 and 8 ml/g.

2. The process as claimed in claim 1, wherein, when said process is carried out in the gas phase, the sacrificial compound is a gaseous compound chosen from water, aqueous ammonia, hydrogen, methane and an alcohol.

3. The process as claimed in claim 1, wherein, when the process is carried out in the liquid phase, the sacrificial compound is a soluble solid or liquid compound chosen from water, aqueous ammonia, an alcohol, an aldehyde or an amine.

4. The process as claimed in claim 1, wherein the irradiation source is an artificial or natural irradiation source.

5. The process as claimed in claim 1, wherein the photocatalyst in the form of a porous monolith comprises a macroporous volume, of which the pore diameter is greater than 10 μm, of less than 0.5 ml/g.

6. The process as claimed in claim 1, wherein the photocatalyst in the form of a porous monolith comprises a bulk density of less than 0.19 g/ml.

7. The process as claimed in claim 1, wherein the photocatalyst in the form of a porous monolith has a specific surface area of between 10 and 1000 $m^2/g$.

8. The process as claimed in claim 1, wherein the photocatalyst in the form of a porous monolith comprises at least one semiconductor and at least one inorganic phase containing silica or alumina not absorbing photons with an energy greater than 4 eV.

9. The process as claimed in claim 1, in which the semiconductor content is between 5% and 70% by weight relative to the total weight of the photocatalyst.

10. The process as claimed in claim 1, wherein the photocatalyst in the form of a porous monolith consists of said semiconductor in monolith form.

11. The process as claimed in claim 1, wherein the semiconductor is chosen from $TiO_2$, $ZnO$, $Cu_2O$, $CuO$, $Ce_2O_3$, $CeO_2$, $In_2O_3$, $SiC$, $ZnS$ and $In_2S_3$, alone or as a mixture.

* * * * *